United States Patent
Sarkisyan et al.

(10) Patent No.: US 8,172,277 B2
(45) Date of Patent: May 8, 2012

(54) PIPE COUPLING DEVICE

(76) Inventors: Saro Sarkisyan, Glendale, CA (US);
Armond Sarkisyan, Glendale, CA (US)

(*) Notice: Subject to any disclaimer, the term of this patent is extended or adjusted under 35 U.S.C. 154(b) by 313 days.

(21) Appl. No.: 12/479,608

(22) Filed: Jun. 5, 2009

(65) Prior Publication Data
US 2009/0302601 A1 Dec. 10, 2009

Related U.S. Application Data

(60) Provisional application No. 61/131,016, filed on Jun. 5, 2008.

(51) Int. Cl.
*F16L 17/00* (2006.01)

(52) U.S. Cl. .......................... 285/373; 285/419

(58) Field of Classification Search .......... 285/364–367, 285/373, 420, 419
See application file for complete search history.

(56) References Cited

U.S. PATENT DOCUMENTS

| | | | | |
|---|---|---|---|---|
| 105,817 A | * | 7/1870 | Lighthall | 285/398 |
| 167,262 A | * | 8/1875 | Lewis | 24/285 |
| 194,697 A | * | 8/1877 | Logan | 138/99 |
| 863,887 A | * | 8/1907 | Stuttle | 285/373 |
| 895,143 A | * | 8/1908 | Augensen | 138/99 |
| 920,169 A | * | 5/1909 | Neuberth | 285/419 |
| 1,928,316 A | * | 9/1933 | Muto | 285/373 |
| 2,449,795 A | * | 9/1948 | Stillwagon | 285/104 |
| 4,391,458 A | * | 7/1983 | Blakeley | 285/112 |

(Continued)

FOREIGN PATENT DOCUMENTS
KR 20-1998-0014395 U 6/1998
(Continued)

OTHER PUBLICATIONS

Corresponding Int'l Application No. PCT/US2009/046491: Notice of Transmittal of the Int'l Search Report and the Written Opinion of the Int'l Searching Authority, or the Declaration, dated Jan. 4, 2010 (including Written Opinion of the Int'l Searching Authority, and Int'l Search Report) (total of 12 pages); Note that Korean language "pdf" copies of references D1, D2, D3 & D4 listed in this document, obtained from KIPO's website, are also submitted with this IDS.

*Primary Examiner* — Aaron Dunwoody
(74) *Attorney, Agent, or Firm* — Law Offices of Kamran Fattahi

(57) ABSTRACT

The present invention is embodied in a pipe coupling device for joining two pipe segments including a cylindrically shaped gasket for receiving the pipe segments and a cylindrically shaped clamp having a first and second semi-cylindrical segment attached by a hinge that extends along a length of one side each segment parallel to the axis of the cylinder. The clamp includes an inner wall having at least one groove forming a channel aligned in each of the semi-cylindrical segments and extending about the circumference of the inner wall of the clamp. A second side of the semi-cylindrical segments includes flanges that extend radially away from the segments. The flanges include complementary apertures and bolts that are received through the apertures for sealing the flanges together. The semi-cylindrical segments are movable about the hinge between an open position and a closed position, wherein the pipe segments are received in opposing ends of the gasket and the clamp is open to receive the pipe segments a gasket combination and then closed about the gasket pipes and secured about the gasket for a sealing engagement by the bolts.

17 Claims, 10 Drawing Sheets

U.S. PATENT DOCUMENTS

| | | | | |
|---|---|---|---|---|
| 4,417,755 | A | * | 11/1983 | Gittleman ..................... 285/373 |
| 4,418,948 | A | * | 12/1983 | Lew et al. ..................... 285/420 |
| 4,561,678 | A | * | 12/1985 | Kunsman ........................ 285/39 |
| 5,431,458 | A | | 7/1995 | Schaub et al. |
| 5,692,544 | A | * | 12/1997 | Friedrich et al. ................ 138/99 |
| 5,711,639 | A | * | 1/1998 | Tessier et al. ................. 405/171 |
| 6,672,139 | B2 | * | 1/2004 | Pampinella ..................... 73/49.8 |
| 7,828,340 | B2 | * | 11/2010 | Heelan et al. .................. 285/409 |
| 2003/0062718 | A1 | * | 4/2003 | Radzik ............................ 285/94 |

FOREIGN PATENT DOCUMENTS

| | | |
|---|---|---|
| KR | 10-0398787 | 9/2003 |
| KR | 10-2004-0068699 A | 8/2004 |
| KR | 10-0926528 | 11/2009 |

* cited by examiner

PIPE COUPLING DEVICE

CROSS-REFERENCE TO RELATED APPLICATION(S)

This application claims the benefit of U.S. Provisional Application Ser. No. 61/131,016 filed on Jun. 5, 2008, which is incorporated herein by reference.

BACKGROUND OF THE INVENTION

1. Field of the Invention

This invention relates to couplings, and particularly to, no-hub couplings for joining segments of pipes.

2. Description of the Related Art

Currently there exist a number of different pipe couplers, and one common form of which is referred to as a "no-hub coupling." Prior to the creation of the "no-hub coupling," cast iron pipes were joined together at a union called a hub, wherein two pipe segments of different diameters where joined at the hub, and the connection was sealed using such things as oakum and melted lead. The no-hub coupling 20 (FIGS. 1 and 2) was later introduced as a mechanically interlocking connection between two pipe segments 22 and 24 wherein a shield 26 covering an elastomeric gasket 28 is used to connect the two pipe segments 22 and 24. In a typical no-hub coupling a shield 26 with a plurality of corrugations 30 parallel to the axis of the pipe is provided, with two or four clamping bands 32 covering the shield 26, and an elastomeric gasket 28 covered by the shield 26, which makes sealing contact with the pipe segments 22 and 24. Various improvements and modifications to the early no-hub couplings that were designed as early as in the 1960's have been attempted. Examples of such designs may be found in U.S. Pat. No. 5,431,458.

However, one drawback of existing no-hub coupling devices is that with the typical no-hub coupling, the coupling shield is in the shape of a cylinder or tube with two open ends wherein the two pipe segments that are to be joined can only be inserted from the two ends of the shield, and then the clamps would have to be tightened. This makes the process of insertion of the pipe segments to be time consuming, cumbersome, and require some force. In addition, the process of tightening of the clamps of the shield over the pipe segments is not very simple, given that the pipe segments are not easy to hold and may slip out before the clamps are completely tightened and closed.

In view of the foregoing, a pipe coupling device is needed that is simple to use, place, hold and tighten over two pipe segments, is able to effectively grip and hold the joining pipe segments together without sliding, and would be relatively inexpensive to manufacture. The present invention fulfills these and other needs.

SUMMARY OF THE INVENTION

The present invention is embodied in a pipe coupling device for joining two pipe segments including a cylindrically shaped gasket for receiving the pipe segments and a cylindrically shaped clamp having a first and second semi-cylindrical segment attached by a hinge that extends along a length of one side each segment parallel to the axis of the cylinder. The clamp includes an inner wall having at least one groove forming a channel aligned in each of the semi-cylindrical segments and extending about the circumference of the inner wall of the clamp. A second side of the semi-cylindrical segments includes flanges that extend radially away from the segments. The flanges include complementary apertures and bolts that are received through the apertures for sealing the flanges together. The semi-cylindrical segments are movable about the hinge between an open position and a closed position, wherein the pipe segments are received in opposing ends of the gasket and the clamp is open to receive the pipe segments a gasket combination and then closed about the gasket pipes and secured about the gasket for a sealing engagement by the bolts.

BRIEF DESCRIPTION OF THE DRAWINGS

Other aspects, advantages and novel features of the invention will become more apparent from the following detailed description of the invention when considered in conjunction with the accompanying drawings wherein.

DESCRIPTION OF THE PREFERRED EMBODIMENT(S)

Figure 1:
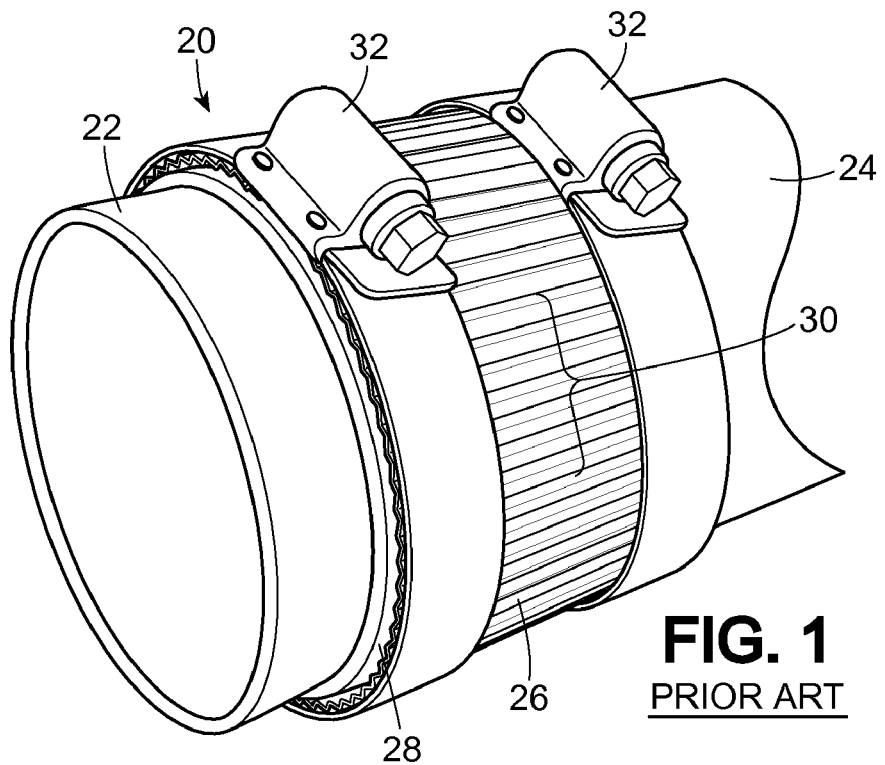
FIG. 1 is a perspective view of a prior art no-hub coupling device.
Figure 2:
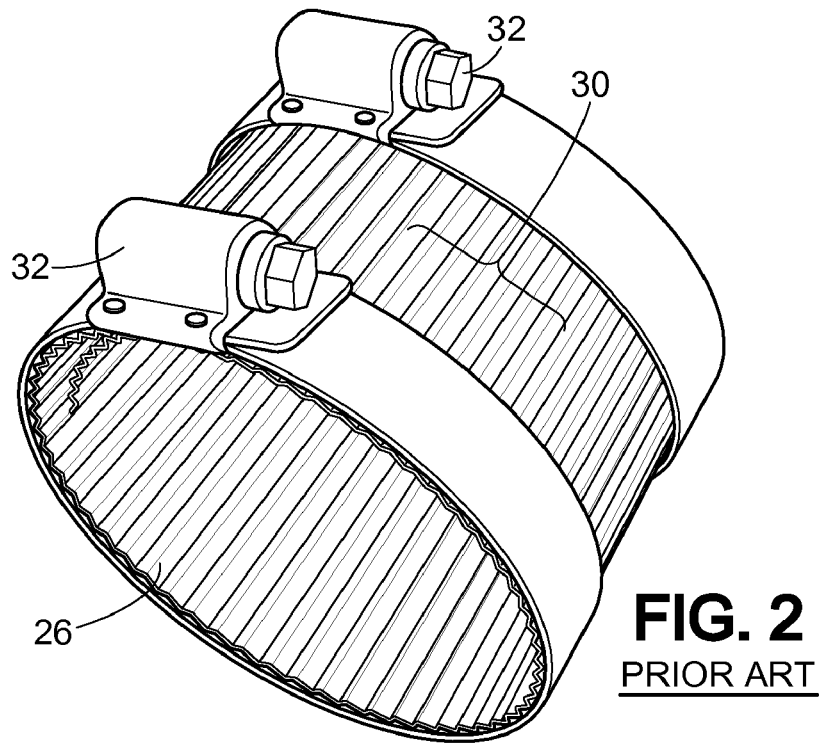
FIG. 2 is a perspective view of a prior art sleeve and clamps of FIG. 1.
Figure 3:
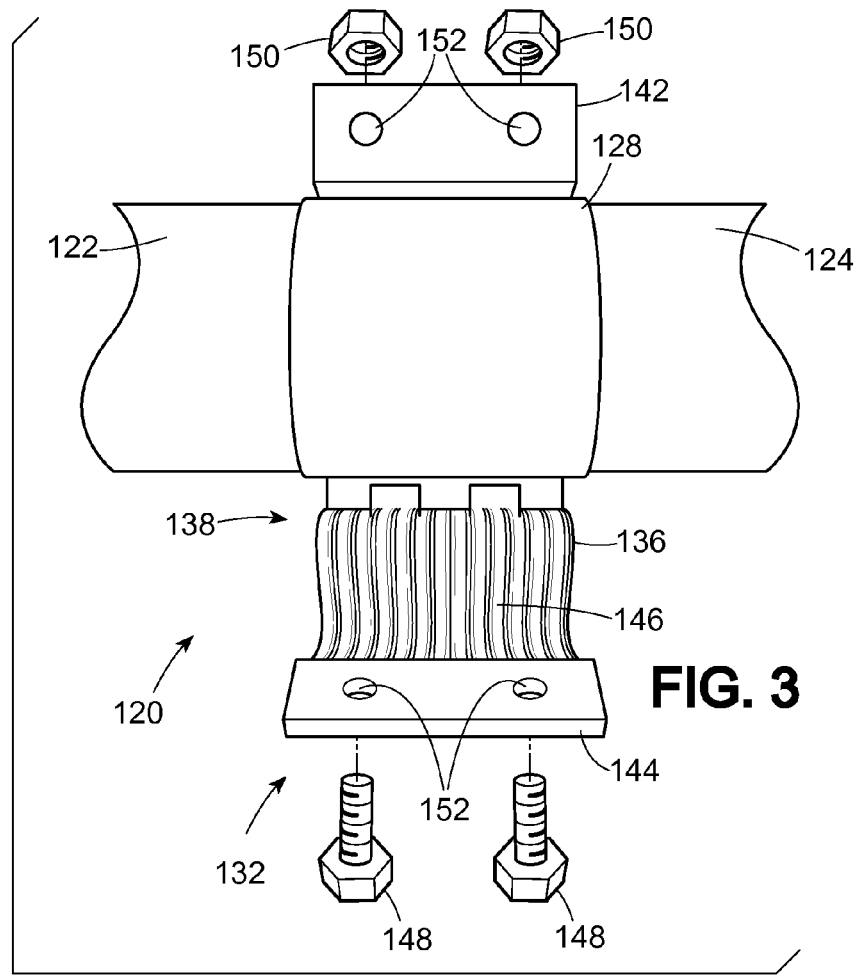
FIG. 3 is a perspective view of a no-hub coupling device according to the present invention.
Figure 4:
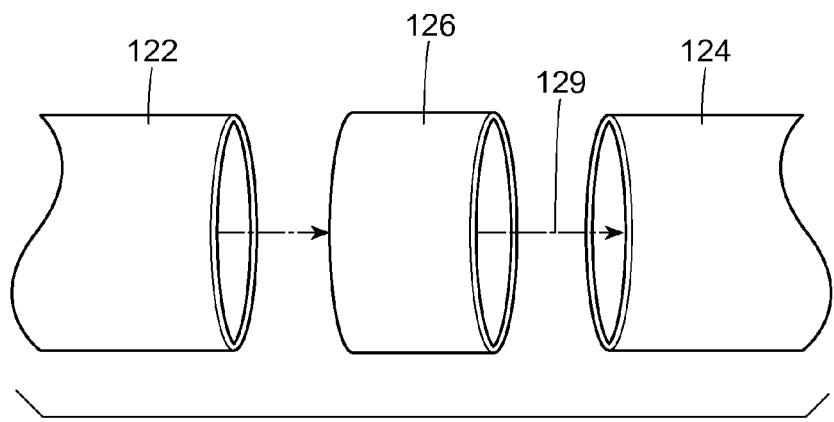
FIG. 4 is an exploded perspective view of pipe segments aligned with the gasket of FIG. 3.
Figure 5:
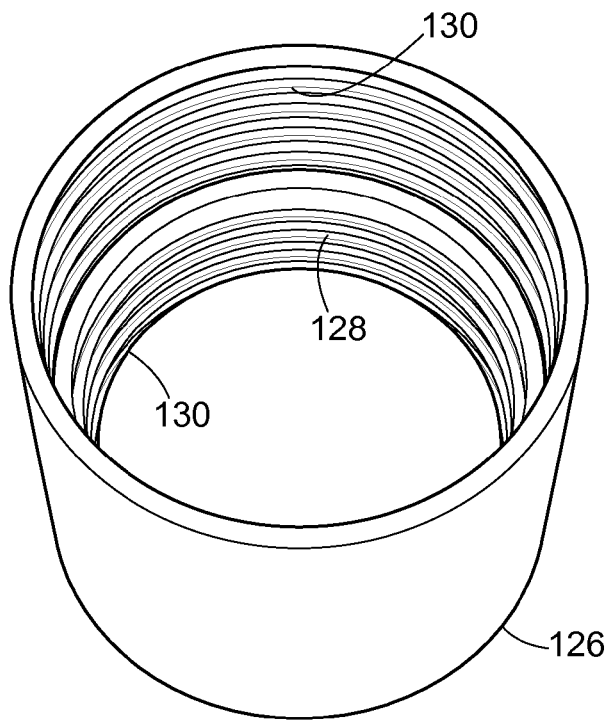
FIG. 5 is a perspective view of the gasket of FIG. 3.
Figure 6:
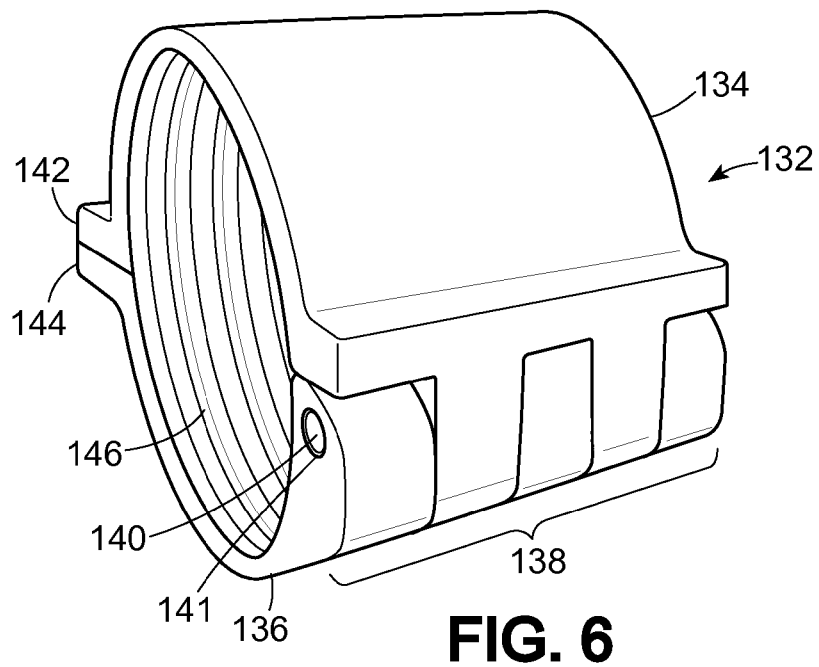
FIGS. 6-9 are perspective views of the clamp of FIG. 3.
Figure 7:
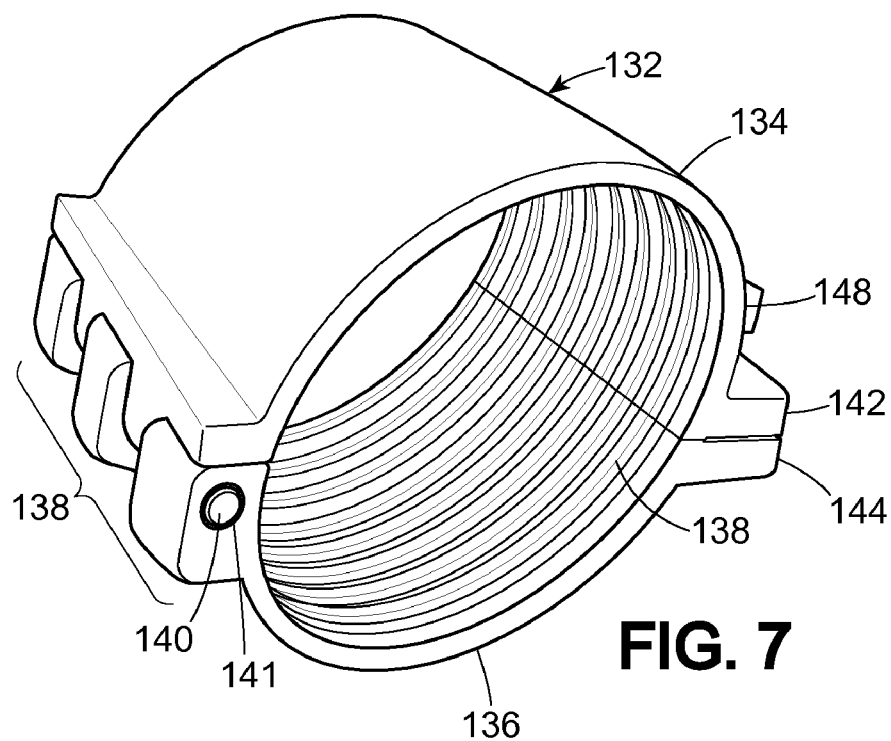
Figure 8:
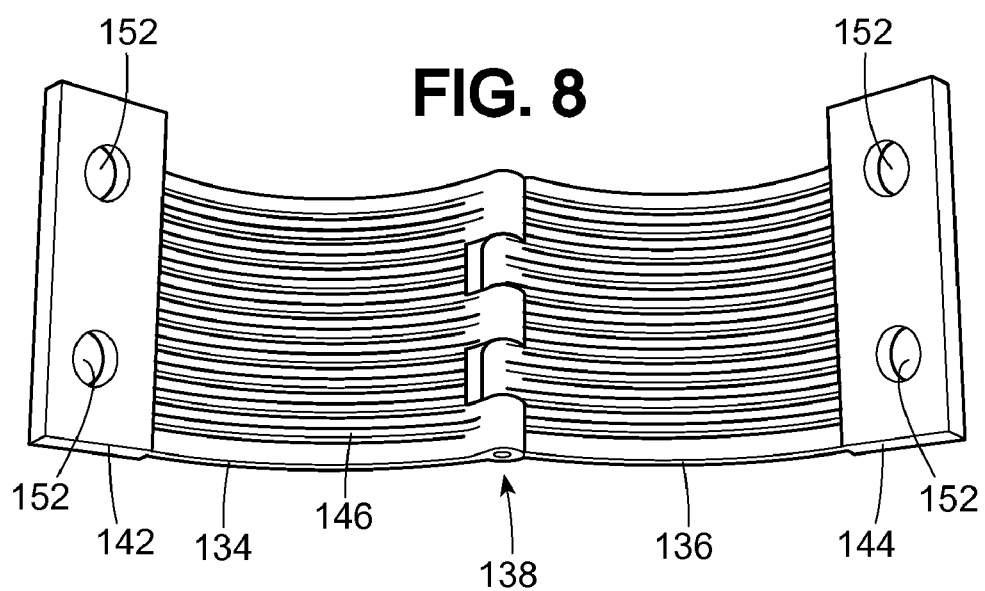
Figure 9:
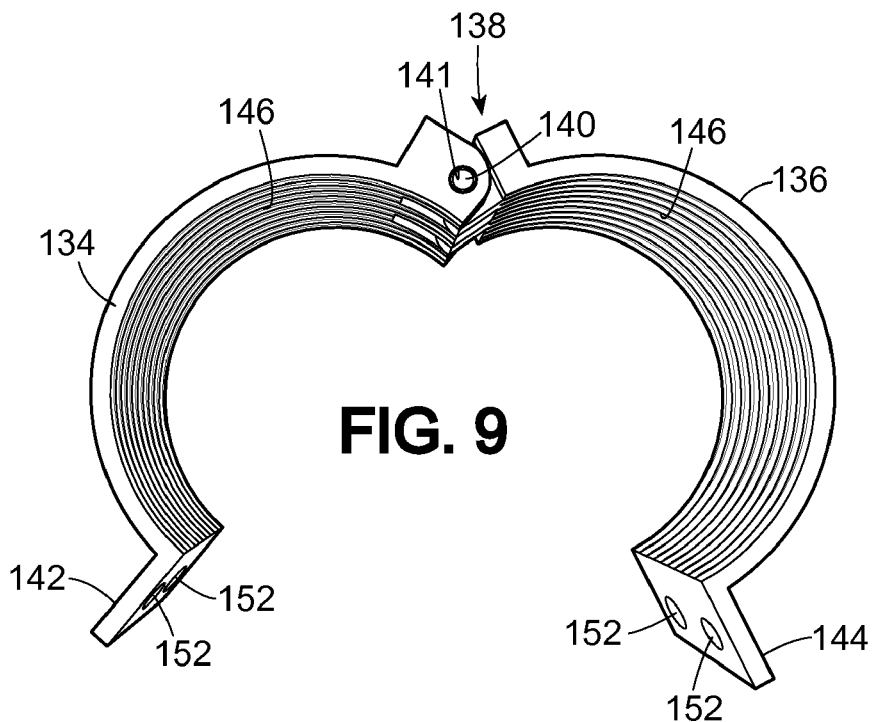
Figure 10:
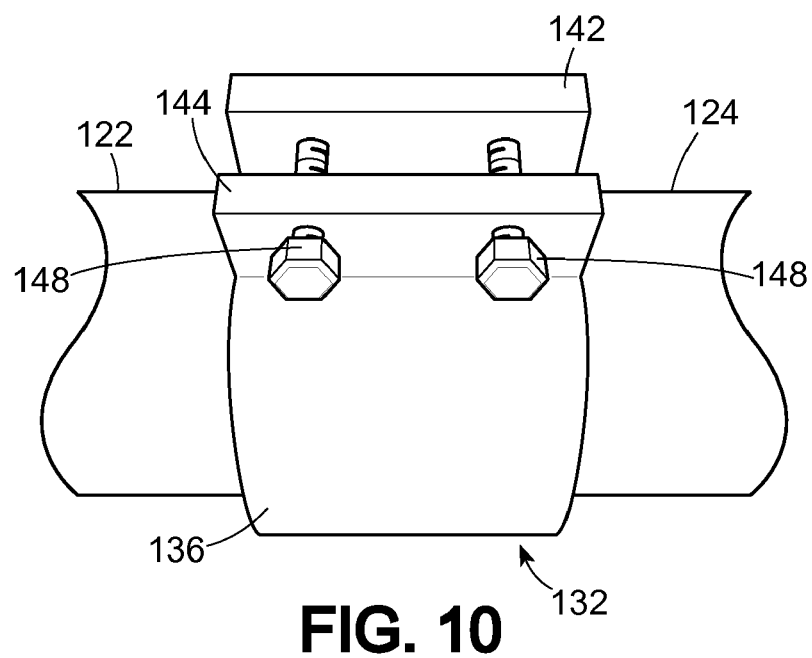
FIGS. 10-12 are perspective views of pipe segments joined by the gasket and clamp of FIG. 3.
Figure 11:
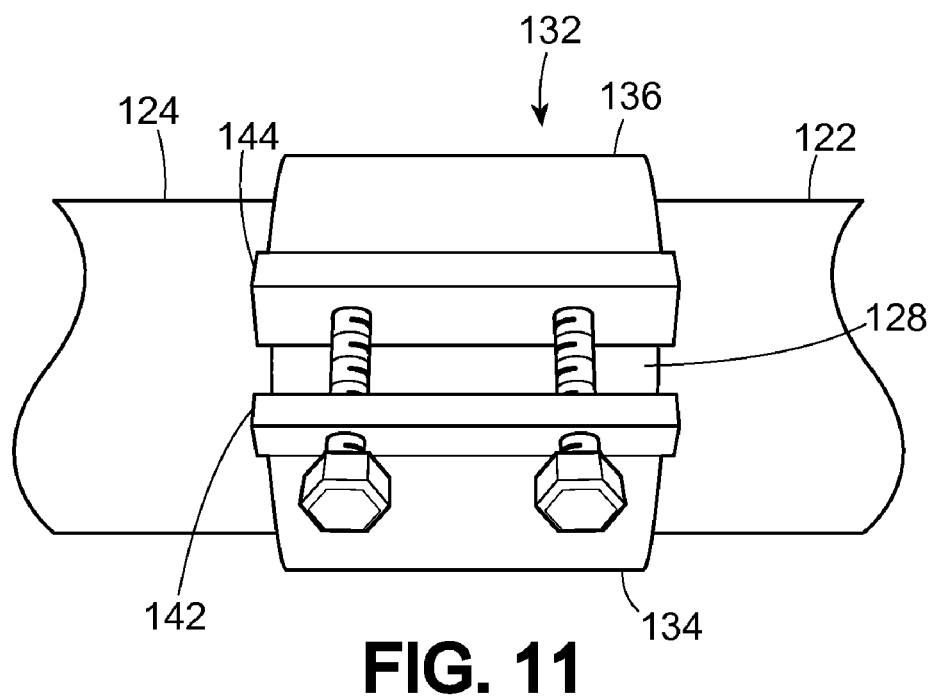
Figure 12:
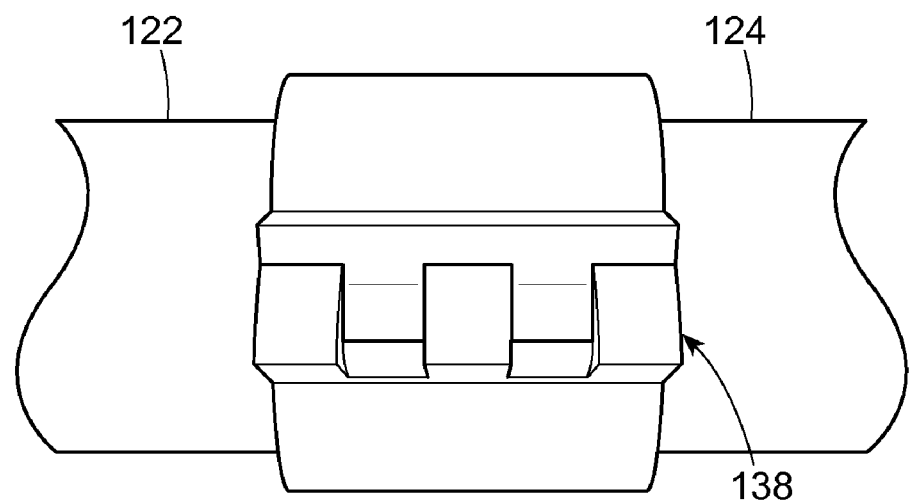

With reference to the Figures for purposes of illustration, the present invention is embodied in a pipe-coupling device 120 (FIGS. 3-12) that is of the no-hub type variety for connecting separate pipe segments 122 and 124. The device includes a watertight gasket 126 preferably molded in a cylindrical shape from injection-molded rubber having a cylindrical cavity sized to receive the pipe segments. A medially located pipe stop 128 allows for the insertion of each pipe segment to cover roughly half of the cavity. A plurality of gasket grooves 130 extends laterally about the inner circumference traverse to the direction of the pipe segment insertion line. These grooves 130 are believed to help prevent movement of the pipe segment during installation of the pipe-coupling device to the pipe segments and further resist leaks during operation. A clamp 132 includes two semi-cylindrical segments 134 and 136 and joined at a hinge 138 by a tongue and groove interface connected by a hinge pin 140 threaded through a common aperture 141 may be moved from an "open" condition about the hinge pin 140 and moved proximate to the gasket such that moving the semi-cylindrical segments to a "closed" condition causes the clamp to enclose the gasket in between. Flanges 142 and 144 are formed at free ends of the semi-cylindrical segments on the side opposite the hinge. The flanges extend away from the segments and allow a pair of bolts 148 to be inserted into holes 152 and secured by nuts 150 for fully closing together between the nut 150 and bolt 148 and locking the coupling device over the two pipe segments 122 and 124 that are joined together inside and maintained with a watertight connection. It will be appreciate that the nuts 150 may be formed integrally with one of the flanges such that the flange aperture is threaded to securely receive the bolt thereby eliminating the need for a separate nut. The clamp includes a plurality of grooves 146 extending about the circumference of the semi-cylindrical segments inner surface that contacts the gasket, wherein the grooves 146 are preferably oriented transverse to the axis of the joining pipes in order to provide better grip. The grooves 146 serve to ensure rings of sealing engagement to prevent leakage from the joint coupling. Furthermore as the clamp is tightened about the gasket, compression and displacement of the gasket material may occur. The grooves serve to provide cavities for receiving displacement of the gasket material while ensuring a secure engagement of the pipe segments.

In this present embodiment the clamp may be manufactured from metals or other hardened material that are preferably non-corrosive to water. Exemplary materials may include aluminum, ceramic, brass or stainless steel formed from a mold in which the hinge aperture and flange apertures are machine drilled. The size of the semi-cylindrical segments is largely intended to be proportional to the size of pipes to be joined and may by manufactured to accommodate any commercially available pipe sizes. Presently pipes may include rigid or semi rigid material including, but not limited to, copper, brass, steel, poly-vinyl-chloride (PVC), etc. . . . .

Alternatively, the device of the present invention as described below may also preferably be made of injection molded hard plastic materials, and if necessary, thin washers (not shown), including, but not limited to, locking washers, can also be used in conjunction with the bolts.

With reference to FIGS. 13A-F, an alternate embodiment of the present invention is disclosed showing a pipe coupling device 220 having a generally cylindrical gasket 222. The gasket is preferably made from a deformable water sealing material such as rubber. The gasket as in FIG. 3 includes a pipe stop 224 and bands of grooves that extend laterally about an inner circumference of the aperture for receiving pipe segments (not shown). The gasket is surrounded by a clamp 228 that includes two semi-cylindrical segments 230 and 232 formed from an injection-molded plastic. Each semi-cylindrical segment includes at least one band of grooves 234 extending along a circumferential direction of an inner wall. The semi-cylindrical segments 230 and 232 are joined at a hinge 236 formed from a tongue and groove interface joined by a hinge pin 238 have a common aperture extending there through. Advantageously, to bolster the strength of the plastic material, the tongue elements of the hinge include buttresses 240 to strengthen the tongue interface with the main body of the semi-cylindrical segments 230 and 232. Flanges 242 and 244 are formed at free ends of the semi-cylindrical segments on the side opposite the hinge 236. The flanges 242 and 244 extend away from the segments and are bolstered by arcuate buttresses 246 at discrete points along the width of the flanges 242 and 244 to strengthen the connection with the semi-cylindrical segment. Furthermore the semi-cylindrical segment is re-enforced by bands 250 extending about the outer wall in a circumferential manner. The flanges 242 and 244 allow a pair of bolts 252 to be inserted into holes and secured by nuts 254 for fully closing together between the nut and bolt and locking the coupling device over the two pipe segments that are joined together inside and maintained with a watertight connection. The nuts are secured against the clamp in nested lock seats 256 formed in the flange. To ensure a proper fit the flanges are sized to nest together and completely secure the gasket such that overlapping nesting sidewalls 258 are included in one flange to enclose and nest the other flange therein. And a tapered overlap flange 260 extends circumferentially away from the nested flange to ensure a sealing engagement with the gasket.

Figure 13A:
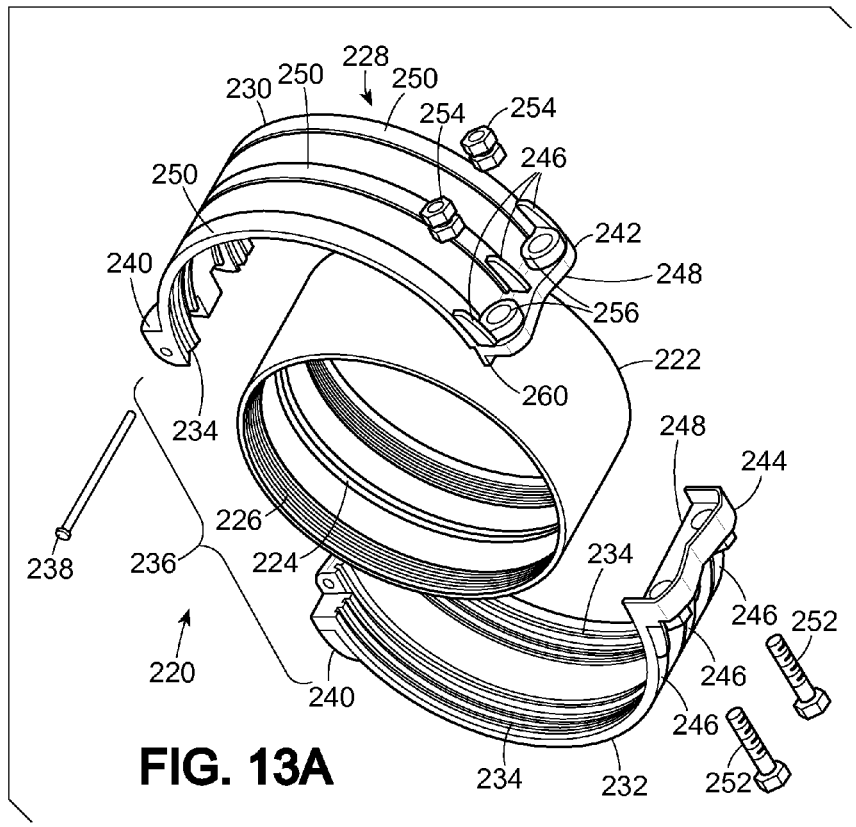
FIG. 13A is an exploded perspective view of an alternate no hub coupling device according to the present invention.
Figure 13B:
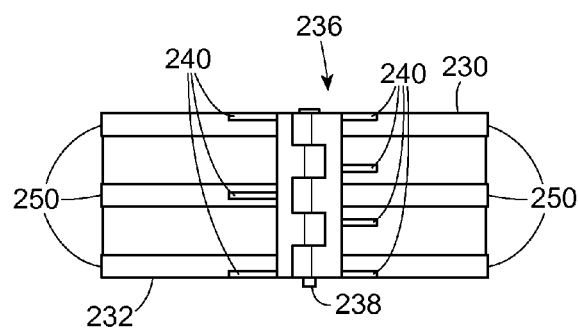
FIG. 13B is rear view of the coupling device of FIG. 13A.
Figure 13C:
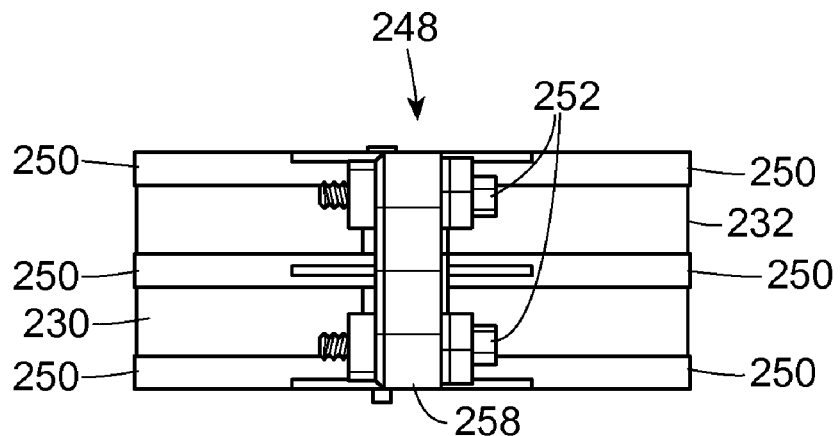
FIG. 13C is front view of the coupling device of FIG. 13A.
Figure 13D:
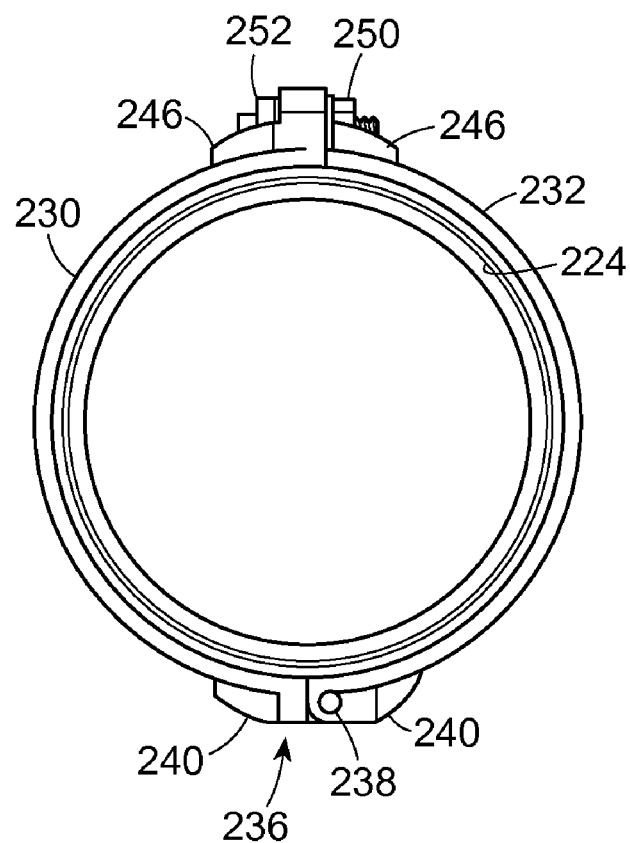
FIG. 13D is a top view of the coupling device of FIG. 13A.
Figure 13E:
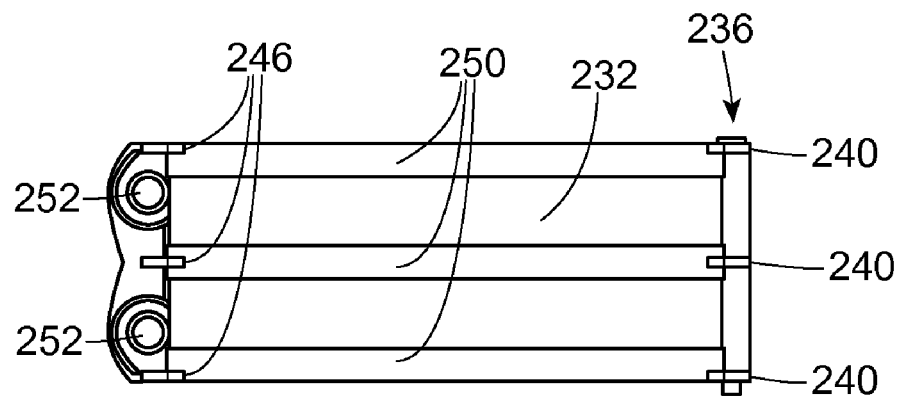
FIG. 13E is a side view of the coupling device of FIG. 13A.
Figure 13F:
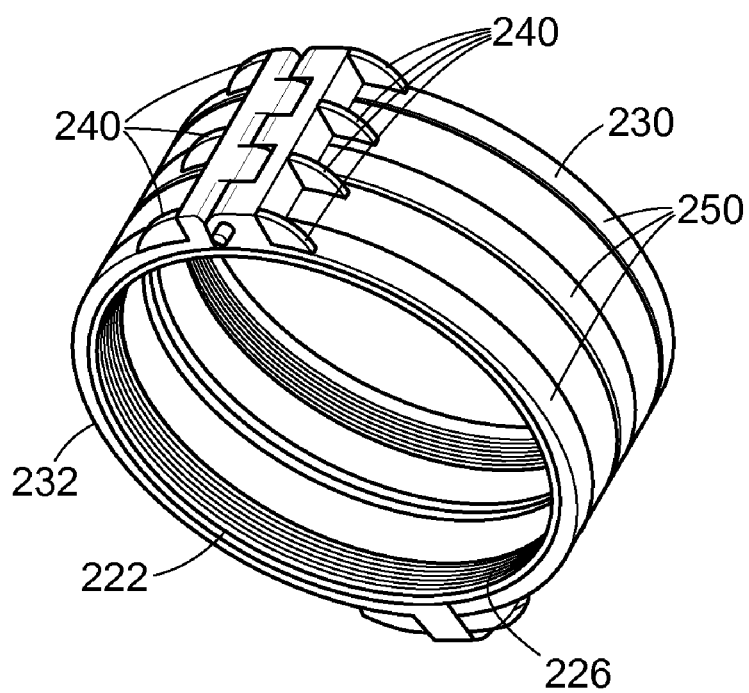
FIG. 13F is a perspective view of the coupling device of FIG. 13A.
Figure 14:
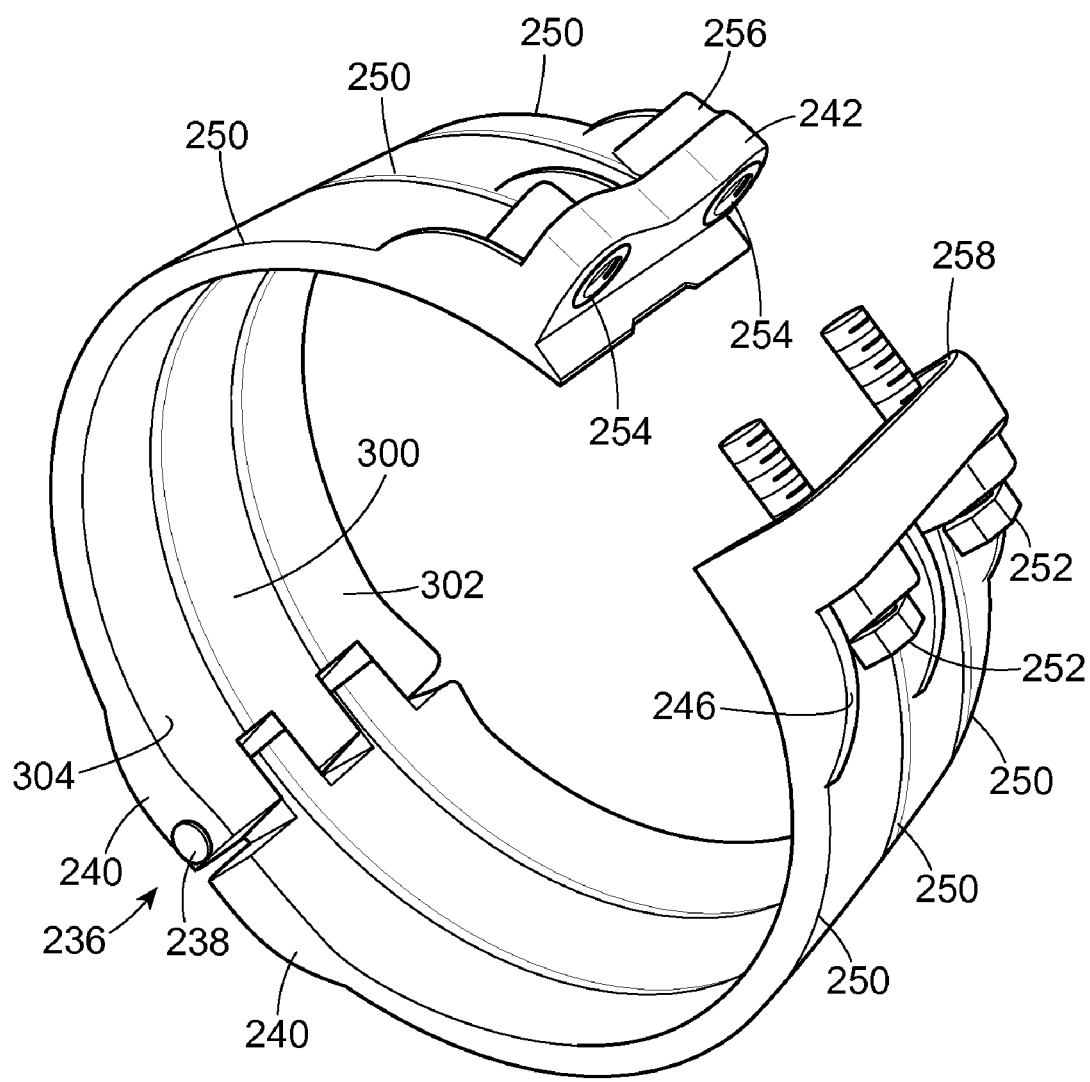
FIG. 14 is a perspective view of an alternate clamp embodiment according to the coupling device of FIG. 13A.

With reference to FIG. 14 and where like reference numerals refer to like structures with FIGS. 13A-F, an alternate embodiment of the clamp of FIG. 13A includes at least one grooved channel 300 surrounded by raised bands 302 and 304 extending circumferentially about the inner walls of the semi-cylindrical segments.

The plastic clamps as described in relation to FIGS. 13 and 14 are capable of forming a watertight seal in a manner similar to the embodiment in FIGS. 3-12 and handle water volumes through the pipes with pressures of up to 15 psi.

It will be appreciated that this pipe-coupling device of the present invention is easier to install that the conventional shield and clamp couplings presently used. Furthermore, the hinge and bolted flanges ensures that the clamp distributes the force of the seal across the entire length of the clamp. This ensures a more integral seal.

Alternatively, it should be appreciated by those skilled in the art that this same design concept might be used for pipe coupling devices that are made of other materials that are suitable for the purposes of this invention.

With the present invention, which can be relatively inexpensive to manufacture, the user can easily place the coupling device over the joining pipes inserted inside the connecting rubber gasket, and can easily tighten the bolts by holding an appropriate wrench in one hand. The present invention can be made in a variety of sizes and diameters to accommodate many different pipe diameters.

A variety of further modifications and alternatives in and to the invention will be apparent to persons skilled in the art without departing from the scope and spirit of the invention.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A pipe coupling device for joining two pipe segments comprising:
   a cylindrically shaped gasket for receiving said pipe segments:
   a cylindrically shaped clamp with a linear cross-sectional profile, consisting of comprising of:
      a first segment; and
      a second segment;
      the first segment has a first arced span transverse a central longitudinal axis of the clamp and a linear first span parallel thereto, defining a first semi-cylindrical segment of the clamp having smooth lateral surfaces with the first span defining a first height of the first semi-cylindrical segment;
      the first segment further includes a first free end and a first attaching end, with both the first free end and the first attaching end including a first set of arcuate buttresses for added strength;
      the first free end is comprised of a first flange that includes nested lock seats that house a first part of a lock mechanism;

the first flange extends and protrudes substantially perpendicular a first outer surface of the first segment, near a first distal end thereof and includes a flat locking surface;

the first free end further includes a tapered lip, extending circumferentially away from the first flange, and positioned underneath a second free end when clamp is in closed position;

the second segment has a second arced span transverse the central longitudinal axis of the clamp and a second linear span parallel thereto, defining a second semi-cylindrical segment of the clamp having smooth lateral surfaces with the second span defining a second height of the second semi-cylindrical segment;

the second segment further includes the second free end and a second attaching end, with both the second free end and the second attaching end including a second set of arcuate buttresses for added strength;

the second free end is comprised of a second flange that accommodates a second part of the lock mechanism;

the second flange extends and protrudes substantially perpendicular a second outer surface of the second segment, near a second distal end thereof;

the second free end further includes a sidewall surrounding a second flat locking surface; the sidewall covers and overlaps the nested lock seats and extends circumferentially away from the second flange;

the first free end and the second free end are interlocked by engaging the first part of the lock mechanism with the second part of the lock mechanism, with the first and second flat locking surfaces touching;

the first attaching end of the first segment is attached to the second attaching end of the second segment by a single hinge mechanism, comprising:

a set of tongue and groove interface extending from the first and second attaching ends of the first and second segments connected by a single hinge pin threaded through a single hinge aperture common to the set of tongue and groove interface of the both first and second attaching ends;

the set of tongue and groove interface includes:

set of tongues that extend from the first and second attaching ends of the first and second segments into a complementary set of grooves of the first and second attaching ends of the first and second segments;

said clamp includes an inner wall having at least one groove forming a channel aligned in each of said semi-cylindrical segments and extending about the circumference of said inner wall of said clamp;

said first and second flanges include complementary apertures and bolts are received through the apertures for sealing the first and second flanges together at the first and second free ends;

said semi-cylindrical segments being movable about said hinge between an open position and a closed position;

wherein said pipe segments are received in opposing ends of said gasket and said clamp is open to receive the pipe segments a gasket combination and then closed about said gasket pipes and secured about said gasket for a sealing engagement by said bolts.

2. The device of claim 1 wherein said gasket includes a pipe stop formed in an inner wall of said gasket; wherein pipes inserted into opposite ends of said cylindrical gasket are inserted until engaging said pipe stop.

3. The device of claim 2 wherein said pipe stop is medially located with the gasket.

4. The device of claim 1 wherein a plurality of grooves are disposed along an inner wall of gasket and said grooves continually extend circumferentially about said inner wall transverse to the longitudinal axis of said pipe segments.

5. The device of claim 1 wherein first and second flanges together by said bolts includes securing said flanges between a nut and bolt combination wherein said bolt is threadably received into said nut.

6. The device of claim 1 wherein first and second flanges together by said bolts includes securing said flanges between threaded apertures in at least one of said flanges wherein said bolt is threadably received into said flange aperture.

7. The device of claim 1 wherein said semi cylindrical segments are made from the group consisting of aluminum, brass, copper, zinc, stainless steel, ceramic, non-water corrosive materials, plastic and PVC.

8. The device of claim 1 wherein said semi cylindrical segments are made from plastic said semi-cylindrical segments including re-enforcement members.

9. The device of claim 8 wherein said re-enforcement members include buttresses joining said hinge to said semi-cylindrical segments.

10. The device of claim 8 wherein said re-enforcement members include buttresses joining said flanges to said semi-cylindrical segments, respectively.

11. The device of claim 8 wherein said re-enforcement members include raised bands extending circumferentially about an outer surface of said semi-cylindrical segments.

12. The device of claim 1 wherein said at least one groove is at least one plurality of grooves.

13. The device of claim 1 wherein said at least one groove is at least one plurality of grooves forming at least one band of grooves.

14. The device of claim 1 wherein said at least one groove is at least one plurality of grooves forming bands of grooves.

15. The device of claim 1 wherein said at least one groove is a plurality of grooves forming a distribution of grooves covering said entire inner surface of said semi-cylindrical segments.

16. A pipe coupling device for joining two pipe segments comprising:

a cylindrically shaped clamp with a linear cross-sectional profile, comprising:

a first segment; and a second segment;

the first segment includes a first free end comprised of a first flange that includes nested lock seats that house a first part of a lock mechanism;

the first flange extends and protrudes substantially perpendicular a first outer surface of the first segment, near a first distal end thereof and includes a flat locking surface;

the first free end further includes a tapered lip, extending circumferentially away from the first flange, and positioned underneath a second free end when clamp is in closed position;

the second segment includes the second free end comprised of a second flange that accommodates a second part of the lock mechanism;

the second flange extends and protrudes substantially perpendicular to a second outer surface of the second segment, near a second distal end thereof;

the second free end further includes a sidewall surrounding a second flat locking surface;

the sidewall extends circumferentially away from the second flange;

the sidewall covers and overlaps the nested lock seats when clamp is in closed position;

the first free end and the second free end are interlocked by engaging the first part of the lock mechanism with the second part of the lock mechanism, with the first and second flat locking surfaces touching;

a first attaching end of the first segment is attached to a second attaching end of the second segment by a single hinge mechanism, enabling the clamp segments to move about the single hinge between an open position and a closed position;

wherein the pipe segments are received in opposing ends of a gasket and the clamp is open to receive the pipe segments and gasket combination and then closed about the gasket pipes and secured about the gasket for a sealing engagement by bolts.

17. A pipe coupling device for joining two pipe segments comprising:

a cylindrically shaped clamp having:

a first segment; and a second segment;

the first segment includes a first free end comprised of a first flange that includes nested lock seats that house a first part of a lock mechanism;

the second segment includes a second free end comprised of a second flange that accommodates a second part of the lock mechanism;

a first attaching end of the first segment is attached to a second attaching end of the second segment by a single hinge mechanism, enabling the clamp segments to move about the single hinge between an open position and a closed position;

the second free end further includes a sidewall surrounding a second flat locking surface;

the sidewall extends circumferentially away from the second flange;

the sidewall covers and overlaps the nested lock seats when clamp is in closed position;

the first free end and the second free end are interlocked by engaging the first part of the lock mechanism with the second part of the lock mechanism, with the first and second flat locking surfaces touching.

* * * * *